Patented June 19, 1928.

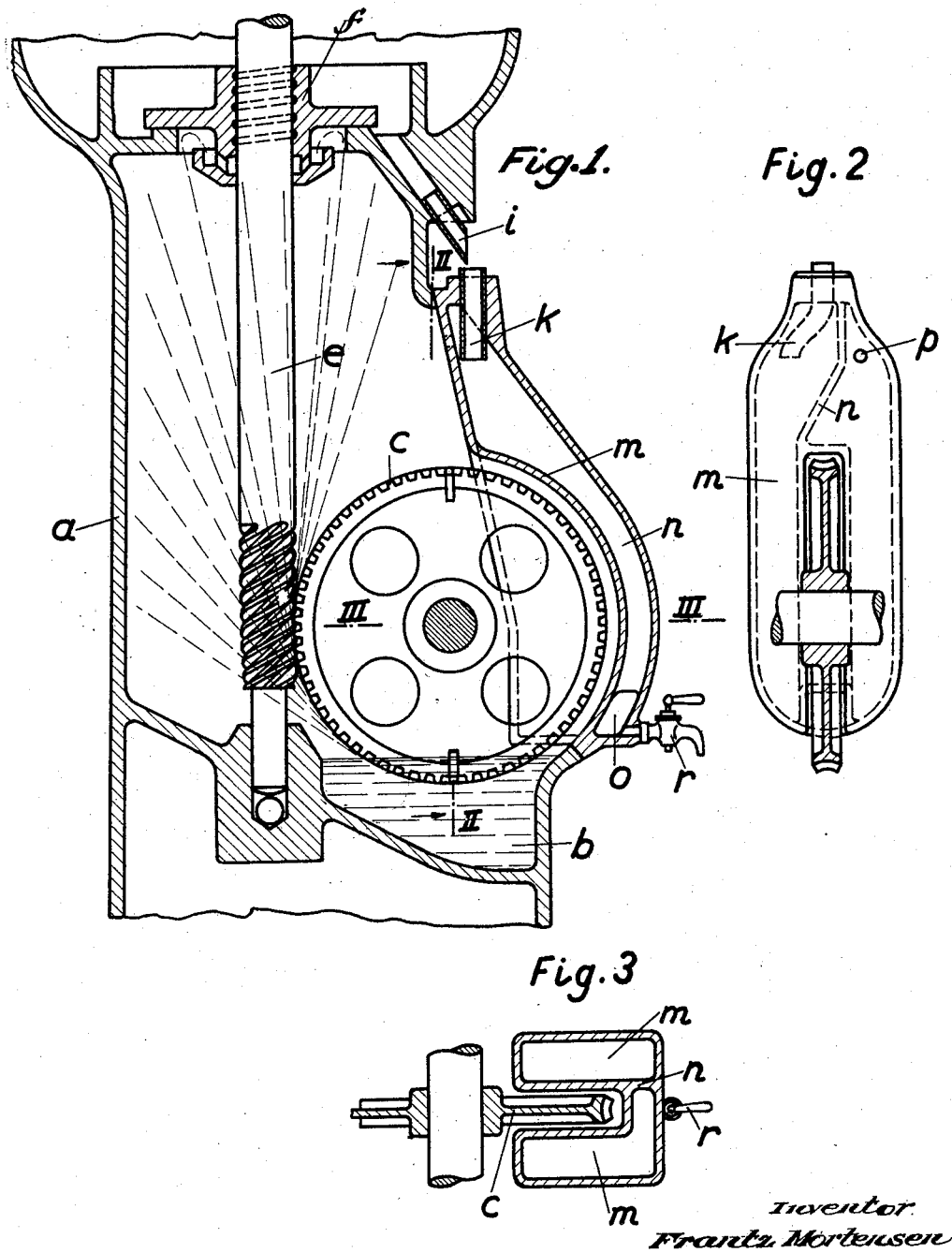

1,674,605

UNITED STATES PATENT OFFICE.

FRANTZ MORTENSEN, OF HELSINGFORS, FINLAND.

MEANS FOR LUBRICATING RAPIDLY-REVOLVING SPINDLES.

Application filed November 6, 1926, Serial No. 146,814, and in Germany November 17, 1925.

This invention relates to the lubrication for revolving spindles especially for use in connection with cream separators in which the oil is thrown from an oil chamber to a bearing for the spindle above the oil chamber and passes from the bearing through a channel to the outside in order to return to the oil chamber through another channel.

The improvement consists therein that the oil before passing to the oil chamber enters a special chamber in which dust, water or other impurities may be separated so that such impurities do not reach the main oil chamber.

The drawing shows how the invention may be carried out.

Fig. 1 is a section of the part of the separator in which the oil circulates.

Fig. 2 is a section through the worm wheel in the line II—II in Fig. 1 and

Fig. 3 is a section of the gear case in the line III—III in Fig. 1.

The frame of the separator is indicated by $a$. $b$ is the main oil chamber and $c$ is a worm wheel which spreads the oil as indicated by the dotted lines so that it reaches the neckbearing $f$ in which the spindle $e$ revolves. After having lubricated the bearing the oil flows through the pipe $i$ to the outside of the frame and drops into pipe $k$, which brings the oil back to the oil chamber.

The oil flows through the pipe $k$ into a separating chamber $m$ which may be shaped as shown in the drawing. The separating chamber is divided by a wall $n$ in two parts and at the bottom an opening connects the two parts. The oil flows from the pipe $k$ into the separating chamber, in which all impurities and water will separate by gravity and the clean oil will raise in the second part of the separating chamber and flow through the opening $p$ into the main oil chamber. The separating chamber is fitted below with a draw-off-cock $r$ so that water and impurities may occasionally be removed.

Claims.—

1. In means for lubricating spindles of cream separators, an oil chamber having a spindle bearing in its upper part, means for throwing the oil into the bearing, a separating chamber outside of the oil chamber, means for allowing the oil from the bearing to flow into the upper end of the separating chamber, and means whereby the clean oil will flow from the upper end of the separating chamber into the oil chamber.

2. In means for lubricating spindles, an oil chamber having a spindle bearing in its upper end, means for throwing the oil into said bearing, a separating chamber outside of the oil chamber, said chamber having two compartments communicating with each other at the bottom, one of the compartments communicating at its top with the oil chamber, and a pipe for delivering the oil from the bearing to the upper end of the other compartment of the separating chamber.

3. In means for lubricating spindles of cream separators, an oil chamber having a spindle bearing in the upper end, means for throwing the oil from the chamber into the bearing, a separating chamber in the wall of the oil chamber and having two vertical compartments, said compartments communicating with each other at their lower ends and one having at its upper end an opening leading into the upper end of an oil chamber, and a pipe communicating with the bearing extending above the separating chamber, and discharging into the upper end of the other compartment of the said separating chamber.

FRANTZ MORTENSEN.